United States Patent
Buchman et al.

(10) Patent No.: US 12,547,312 B2
(45) Date of Patent: Feb. 10, 2026

(54) MAPPING STORAGE OBJECTS TO STORAGE TIERS USING DIGITAL TWINS

(71) Applicant: Dell Products L.P., Round Rock, TX (US)

(72) Inventors: Ophir Buchman, Raanana (IL); Tomer Shachar, Beer-Sheva (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/596,993

(22) Filed: Mar. 6, 2024

(65) Prior Publication Data

US 2025/0284390 A1  Sep. 11, 2025

(51) Int. Cl.
*G06F 3/06* (2006.01)

(52) U.S. Cl.
CPC .......... *G06F 3/0604* (2013.01); *G06F 3/0647* (2013.01); *G06F 3/0664* (2013.01); *G06F 3/067* (2013.01)

(58) Field of Classification Search
CPC .... G06F 3/0604; G06F 3/0647; G06F 3/0664; G06F 3/067
See application file for complete search history.

(56) References Cited

U.S. PATENT DOCUMENTS

| | | | | |
|---|---|---|---|---|
| 9,569,569 B1 * | 2/2017 | Colon | | G06F 30/33 |
| 10,235,055 B1 * | 3/2019 | Saad | | G06F 3/0653 |
| 11,210,009 B1 * | 12/2021 | Freilich | | G06F 11/2071 |
| 2003/0046270 A1 * | 3/2003 | Leung | | G06F 16/13 |
| 2020/0233598 A1 * | 7/2020 | Bezugly | | G06N 20/20 |
| 2023/0084906 A1 * | 3/2023 | Karri | | G06F 3/0604 |
| | | | | 711/154 |
| 2023/0115127 A1 * | 4/2023 | Ghosh | | G06F 3/04842 |
| | | | | 345/633 |

(Continued)

OTHER PUBLICATIONS

"Amazon S3 Intelligent-Tiering Storage Class"; https://aws.amazon.com/s3/storage-classes/intelligent-tiering/; downloaded on Feb. 27, 2024.

(Continued)

*Primary Examiner* — Ryan Bertram
(74) *Attorney, Agent, or Firm* — Ryan, Mason & Lewis, LLP

(57) ABSTRACT

Techniques are provided for mapping storage objects to storage tiers using digital twins. One method comprises initializing at least one virtual representation for multiple storage tiers of a storage system using storage metrics of the respective storage tier, wherein the storage system comprises storage objects, and wherein a storage object is mapped to a particular storage tier according to a storage object to storage tier placement option; configuring the at least one virtual representation, for a plurality of iterations, based on telemetry data for the storage objects, wherein each iteration corresponds to a different storage object to storage tier placement option and generates a storage object placement score for the respective storage object to storage tier placement option; selecting a given storage object to storage tier placement option based on the respective storage object placement score; and initiating an implementation of the selected storage object to storage tier placement option.

20 Claims, 12 Drawing Sheets

(56) References Cited

U.S. PATENT DOCUMENTS

2024/0281155 A1* 8/2024 della Monica ........ G06F 3/0625
2024/0345812 A1* 10/2024 Tashkandi ............... G06F 3/067

OTHER PUBLICATIONS

"OceanStor V500R007 SmartTier Feature Guide for Block"; https://support.huawei.com/enterprise/en/doc/EDOC1000181474/2765bb61/configuring-a-smarttier-policy; downloaded on Feb. 27, 2024.
Goff, Carol; "Fabric Pool"; https://docs.netapp.com/us-en/ontap/concepts/fabricpool-concept.html; dated Jul. 25, 2023.

* cited by examiner

DESIGNATED STORAGE METRICS 400
FOR SIMULATING STORAGE TIERS

| STORAGE METRIC | DESCRIPTION |
|---|---|
| CAPACITY LIMITATIONS | AMOUNT OF STORAGE SPACE AVAILABLE IN STORAGE TIER |
| DATA TRANSFER LIMITATIONS | DATA THROUGHPUT AVAILABLE IN STORAGE TIER |
| COST CALCULATION ALGORITHM | METHOD FOR CALCULATING COSTS ASSOCIATED WITH STORAGE TIER |

FIG. 4

DESIGNATED TELEMETRY METRICS 500 CHARACTERIZING EXPECTED BEHAVIOR OF STORAGE OBJECTS

| TELEMETRY METRIC(S) | TO DETERMINE: |
|---|---|
| TOTAL READ OPERATIONS DURING SPECIFIED PERIOD | AMOUNT OF DATA READ FROM STORAGE OBJECT TO EXTERNAL HOST DEVICES |
| TOTAL WRITE OPERATIONS DURING SPECIFIED PERIOD | AMOUNT OF DATA WRITTEN TO STORAGE OBJECT FROM EXTERNAL HOST DEVICES |
| MAXIMUM THROUGHPUT DURING SPECIFIED PERIOD | THROUGHPUT REQUIRED TO SUPPORT LOAD ON STORAGE OBJECT |
| STORAGE OBJECT CAPACITY AND MINIMAL DATA REDUCTION RATIO DURING SPECIFIED PERIOD | STORAGE CAPACITY REQUIRED TO STORE THE STORAGE OBJECT FOLLOWING DATA REDUCTION |

FIG. 5

STORAGE OBJECT TO STORAGE TIER PLACEMENT OPTIONS 600

| STORAGE OBJECT TO STORAGE TIER PLACEMENT OPTION | STORAGE OBJECT A ASSIGNMENT | STORAGE OBJECT B ASSIGNMENT | STORAGE OBJECT C ASSIGNMENT |
|---|---|---|---|
| 1 | TIER 1 | TIER 1 | TIER 1 |
| 2 | TIER 1 | TIER 1 | TIER 2 |
| 3 | TIER 1 | TIER 2 | TIER 1 |
| 4 | TIER 1 | TIER 2 | TIER 2 |
| 5 | TIER 2 | TIER 1 | TIER 1 |
| 6 | TIER 2 | TIER 1 | TIER 2 |
| 7 | TIER 2 | TIER 2 | TIER 1 |
| 8 | TIER 2 | TIER 2 | TIER 2 |

FIG. 6

PLACEMENT OPTIONS 700
(PERFORMANCE LIMITATIONS)

| STORAGE OBJECT TO STORAGE TIER PLACEMENT OPTION | TIER 1 IOPS REQUIREMENT | TIER 2 IOPS REQUIREMENT | FEASIBLE? |
|---|---|---|---|
| A-1, B-1, C-1 | 3000 | 0 | NO |
| A-1, B-1, C-2 | 2500 | 500 | NO |
| A-1, B-2, C-1 | 1000 | 2000 | YES |
| A-1, B-2, C-2 | 500 | 2500 | YES |
| A-2, B-1, C-1 | 2500 | 500 | NO |
| A-2, B-1, C-2 | 2000 | 1000 | NO |
| A-2, B-2, C-1 | 500 | 2500 | YES |
| A-2, B-2, C-2 | 0 | 3000 | YES |

PLACEMENT OPTIONS 750
(CAPACITY LIMITATIONS)

| PLACEMENT OPTION | GB TIER 1 | GB TIER 2 | FEASIBLE? |
|---|---|---|---|
| A-1, B-1, C-1 | 140 | 0 | NO |
| A-1, B-1, C-2 | 110 | 30 | NO |
| A-1, B-2, C-1 | 90 | 50 | YES |
| A-1, B-2, C-2 | 60 | 80 | YES |
| A-2, B-1, C-1 | 80 | 60 | YES |
| A-2, B-1, C-2 | 50 | 90 | YES |
| A-2, B-2, C-1 | 30 | 110 | YES |
| A-2, B-2, C-2 | 0 | 140 | YES |

FIG. 7

TIER 1 STORAGE OBJECT PLACEMENT SCORE 800
FOR PLACEMENT OPTION 4 (A-1, B-2, C-2)

| OBJECT | CAPACITY | "IN" TRAFFIC | "OUT" TRAFFIC | REPLICATION |
|---|---|---|---|---|
| A | 1024GB | 500GB | 20GB | 0GB / DAY |
| TOTAL | 1024GB | 500GB | 20GB | 0GB / DAY |
| PRICING | $0.0125 PER GB | $0.00 PER GB | $0.085 PER GB | $0.015 PER GB |
| TOTAL | 12.80 USD | 0.00 USD | 1.70 USD | 0.00 USD |
| TOTAL COST | | | | 14.50 USD |

TIER 2 STORAGE OBJECT PLACEMENT SCORE 850
FOR PLACEMENT OPTION 4 (A-1, B-2, C-2)

| OBJECT | CAPACITY | "IN" TRAFFIC | "OUT" TRAFFIC | REPLICATION |
|---|---|---|---|---|
| B | 100GB | 20GB | 400GB | 5GB / DAY |
| C | 200GB | 500GB | 10GB | 50GB / DAY |
| TOTAL | 300GB | 520GB | 410GB | 55GB / DAY |
| PRICING | $0.022 PER GB | $0.00 PER GB | $0.085 PER GB | $0.015 PER GB |
| TOTAL | 6.60 USD | 0.00 USD | 34.85 USD | 0.83 USD |
| TOTAL COST | | | | 42.28 USD |

FIG. 8

MAPPING STORAGE OBJECTS TO STORAGE TIERS USING DIGITAL TWINS

BACKGROUND

Storage tiering involves categorizing data into different storage tiers of a storage system based on, for example, an access frequency and/or importance of the data. Frequently accessed data may be stored, for example, on a high-performance storage tier and less frequently accessed data may be stored on a slower, more cost-effective storage tier. When storage objects, such as storage devices, storage volumes and/or virtual storage volumes, are deployed, they are typically assigned to a storage tier according to a storage tiering policy.

SUMMARY

Illustrative embodiments of the disclosure provide techniques for mapping storage objects to storage tiers using digital twins. An exemplary method comprises initializing at least one virtual representation for respective ones of a plurality of storage tiers of a storage system using one or more designated storage metrics of the respective storage tiers, wherein the storage system comprises a plurality of storage objects, wherein a given storage object is mapped to a particular storage tier according to a storage object to storage tier placement option; configuring the at least one virtual representation for the respective ones of the plurality of storage tiers, for a plurality of iterations, based at least in part on telemetry data for respective ones of the plurality of the storage objects, wherein each of the plurality of iterations corresponds to a different one of a plurality of storage object to storage tier placement options and generates a storage object placement score for the respective storage object to storage tier placement option; selecting a given one of the plurality of storage object to storage tier placement options based at least in part on the respective storage object placement score; and initiating an implementation of the selected storage object to storage tier placement option in the storage system.

Illustrative embodiments can provide significant advantages relative to conventional storage object placement techniques. For example, problems associated with existing storage object placement techniques are overcome in one or more embodiments by configuring a virtual representation of a storage system using one or more storage metrics for respective storage tiers and telemetry data for respective storage objects to determine a storage object placement score for a plurality of storage object to storage tier placement options and selecting a given storage object to storage tier placement option using the respective storage object placement scores.

These and other illustrative embodiments include, without limitation, methods, apparatus, networks, systems and processor-readable storage media.

BRIEF DESCRIPTION OF THE DRAWINGS

FIG. 4 is a sample table illustrating designated storage metrics for simulating one or more storage tiers in an illustrative embodiment;

FIG. 5 is a sample table illustrating designated telemetry data for characterizing an expected behavior of one or more storage objects in an illustrative embodiment;

FIG. 6 is a sample table illustrating representative storage object to storage tier placement options in an illustrative embodiment;

FIG. 7 comprises sample tables illustrating feasible storage object to storage tier placement options in illustrative embodiments;

FIG. 8 comprises sample tables illustrating a calculation of a storage object placement score for multiple storage tiers of a representative storage object to storage tier placement option in illustrative embodiments;

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

As noted above, storage tiering involves categorizing data into different storage tiers based on an access frequency and/or importance of the data. Frequently accessed data may be stored, for example, on a high-performance storage tier and less frequently accessed data may be stored on a slower, more cost-effective storage tier. This approach may also reduce spending by allocating high-end storage arrays where necessary and cost-effective storage arrays for less critical data, to reduce (e.g., optimize) the cost of storage infrastructure.

In many cases, storage tiering decisions are difficult due to the number of factors to be taken into consideration (such as a limited budget, limited availability of high-end resources, and a large matrix of placement options). Currently, storage tiering decisions are often based on intuition, taking into consideration one or more factors (e.g., cost, free capacity and estimated workload per host).

As noted above, when storage objects are deployed, they are typically assigned (e.g., mapped) to a particular storage tier based on various factors, such as a number of storage objects already assigned to the particular storage tier. The storage object placement often remains unchanged for the lifetime of each storage object.

In one or more embodiments of the present disclosure, storage object placement techniques are provided that employ digital twins of storage tiers to evaluate storage object placement scores for different storage object to storage tier placement options, determined using telemetry data for the storage objects. In at least some embodiments, a storage object placement score is determined for each storage object to storage tier placement option using the respective digital twin.

Figure 1:
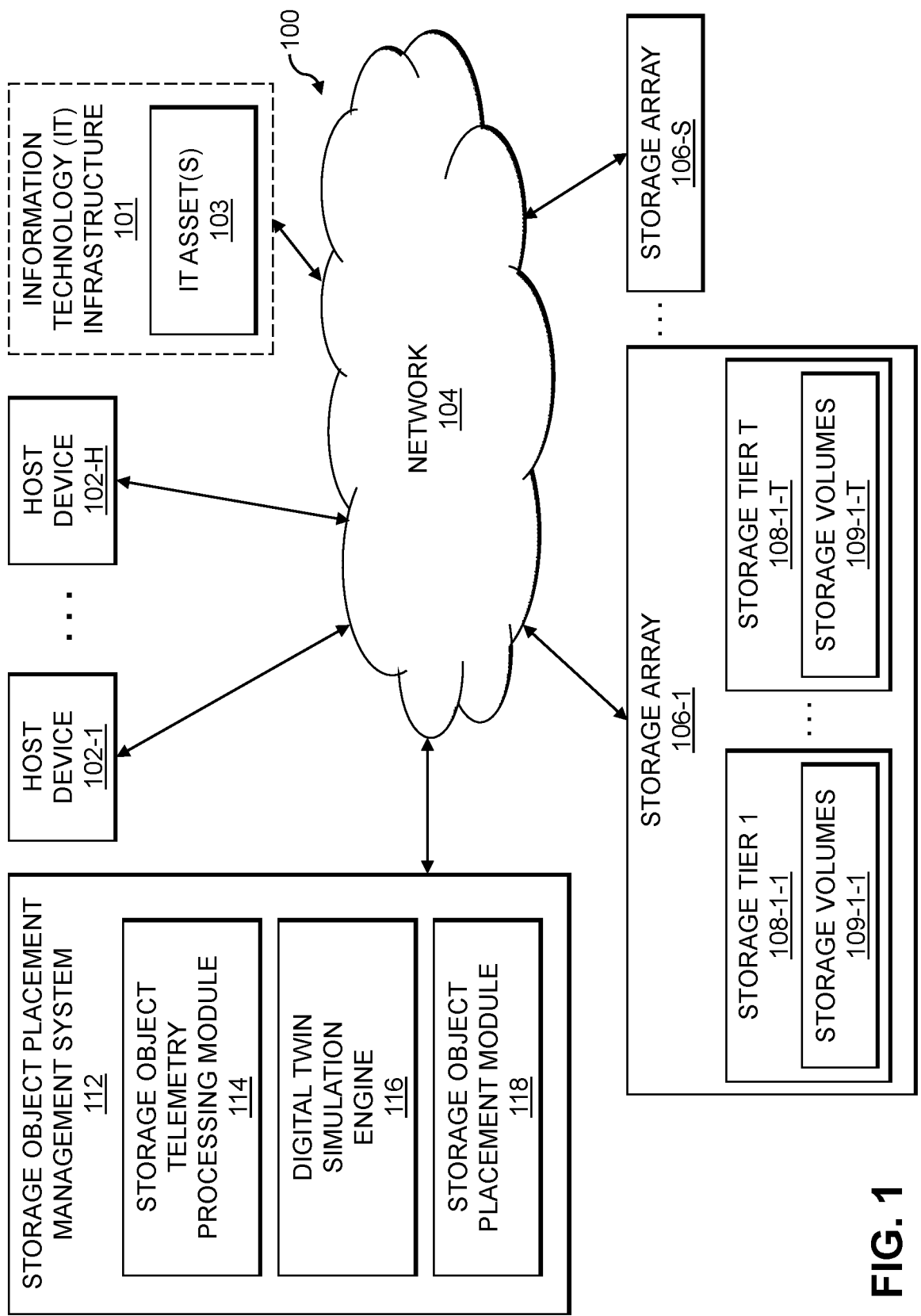
FIG. 1 is a block diagram of an information processing system configured for mapping storage objects to storage tiers using digital twins in an illustrative embodiment.

FIG. 1 is a block diagram of an information processing system 100 configured for mapping storage objects to storage tiers using digital twins in an illustrative embodiment. The information processing system 100 comprises one or more host devices 102-1, . . . 102-H (collectively, host devices 102) that communicate over a network 104 with a storage object placement management system 112.

One or more storage arrays 106-1, . . . 106-S (collectively, storage arrays 106) are also coupled to the network 104. The storage array 106-1, for example, comprises one or more storage tiers 108-1-1, . . . 108-1-T (collectively, storage tiers 108). The storage tiers 108 comprise storage volumes 109-1-1, . . . 109-1-T (collectively, storage volumes 109). The storage volumes 109 illustratively comprise respective logical units (LUNs) or other types of logical storage volumes. The storage array 106-1 and its associated storage tiers 108 are an example of what is more generally referred to herein as a "storage system." This storage system in the present embodiment is shared by the host devices 102, and is therefore an example of a shared storage system. In embodiments where there is only a single host device 102, the host device 102 may be configured to have exclusive use of the storage system.

The storage arrays 106 should also be understood to include storage controllers and other additional modules and/or components typically found in conventional implementations of storage arrays and storage systems, although such additional modules and other components are omitted from the figure for clarity and simplicity of illustration. For example, in some embodiments, the storage controllers may have one or more local caches or allocated portions of a global cache associated therewith, although numerous alternative arrangements are possible. The storage controllers can be implemented as respective storage processors, directors or other storage system components configured to control storage system operations relating to processing of IO operations.

In some embodiments, the storage arrays 106 may represent respective storage nodes of a storage cluster that hosts virtual volumes for one or more virtual machines (VMs). The network 104, in some embodiments, may comprise a storage area network (SAN). Additional details of a virtualization environment that utilizes virtual volume storage are described below.

Each of the other storage arrays 106, such as storage array 106-S, is assumed to be configured to include one or more storage tiers 108 and storage volumes 109, in a manner similar to that illustrated for storage array 106-1 in FIG. 1.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Also coupled to the network 104 is an information technology (IT) infrastructure 101 comprising one or more IT assets 103. The IT assets 103 may comprise physical and/or virtual computing resources in the IT infrastructure 101. Physical computing resources may include physical hardware such as servers, host devices, storage systems, networking equipment, Internet of Things (IoT) devices, and other types of processing and computing devices including desktops, laptops, tablets, smartphones, etc. Virtual computing resources may include VMs, containers, etc.

The IT assets 103 of the IT infrastructure 101 may host applications that are utilized by respective one or more client devices, such as in accordance with a client-server computer program architecture. In some embodiments, the applications comprise web applications designed for delivery from assets in the IT infrastructure 101 to users (e.g., of client devices) over the network 104. Various other examples are possible, such as where one or more applications are used internal to the IT infrastructure 101 and not exposed to the client devices. It should be appreciated that, in some embodiments, some of the IT assets 103 of the IT infrastructure 101 may themselves be viewed as applications or more generally as software or hardware. For example, individual ones of the IT assets 103 that are virtual computing resources implemented as software containers may represent software. As another example, individual ones of the IT assets 103 that are physical computing resources may represent hardware devices.

The IT assets 103 in such an arrangement illustratively provide compute services such as execution of one or more applications on behalf of one or more users. Such applications illustratively generate IO operations that are processed by a corresponding one of the storage arrays 106. The term "input-output" as used herein refers to at least one of input and output. For example, IO operations may comprise write requests and/or read requests directed to logical addresses of a particular storage volume 109 of a given one of the storage arrays 106. These and other types of IO operations are also generally referred to herein as IO requests. References herein to terms such as "input-output" and "IO" should be understood to refer to input and/or output. Thus, an IO operation relates to at least one of input and output.

The term "user" herein is intended to be broadly construed so as to encompass numerous arrangements of human, hardware, software or firmware entities, as well as combinations of such entities.

It should be apparent that the term "storage system" as used herein is intended to be broadly construed and may encompass multiple distinct instances of a commercially-available storage array. Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

Also, the term "storage device" as used herein is intended to be broadly construed, so as to encompass, for example, a logical storage device such as a LUN or other logical storage volume. A logical storage device can be defined in the storage tiers 108 to include different portions of one or more physical storage devices. Storage tiers 108 may therefore be viewed as comprising respective LUNs or other logical storage volumes.

The term "storage object" as used herein is intended to be broadly construed, so as to encompass, for example, storage tiers 108 and/or storage volumes 109 (including virtual storage volumes), as would be apparent to a person of ordinary skill in the art.

The storage object placement management system 112 includes a storage object telemetry processing module 114, a digital twin simulation engine 116 and a storage object placement module 118. The storage object telemetry processing module 114 evaluates telemetry data (e.g., obtained from a storage tier and/or a storage system) for the storage objects, as discussed further below in conjunction with FIGS. 2 and 4, for example. The digital twin simulation engine 116 employs digital twins to simulate one or more storage tiers and to evaluate respective storage object placement scores, determined using telemetry data for the storage objects, for various storage object to storage tier placement options.

A digital twin typically refers to a virtual representation (e.g., a virtual copy or a digital model) of a physical or digital product, process, and/or system. A digital twin can be used to analyze the performance of a physical product, process, and/or system in order to better understand operations associated with the product, process, and/or system being virtually represented.

In one or more embodiments, digital twins are employed as virtual representations of one or more storage tiers to simulate various storage object to storage tier placement options and to evaluate respective storage object placement scores for the simulated storage object to storage tier placement options.

The storage object placement module 118, in at least some embodiments, is configured to select and place one or more storage objects with different storage tiers 108 (e.g., different ones of the storage tiers 108) based on the computed storage object placement scores.

At least portions of the functionality of the storage object telemetry processing module 114, digital twin simulation engine 116 and storage object placement module 118 may be implemented at least in part in the form of software that is stored in memory and executed by a processor.

The storage object placement management system 112 (or portions thereof) may be part of one or more storage arrays 106 and/or of one or more host devices 102. Thus, although shown as external to the host devices 102 and storage arrays 106 in the FIG. 1 embodiment, it should be appreciated that the storage object placement management system 112 in other embodiments may be implemented at least in part internal to one or more of the host devices 102 and/or one or more of the storage arrays 106. For example, one or more of the host devices 102 and/or storage arrays 106 may provide at least a portion of the storage object telemetry processing module 114 for processing telemetry data and/or performing one or more calculations that use such telemetry data, as discussed further below in conjunction with FIG. 5, for example.

The host devices 102, storage arrays 106, and the storage object placement management system 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102, the storage arrays 106 and the storage object placement management system 112 may be implemented on respective distinct processing platforms, although numerous other arrangements are possible. For example, in some embodiments at least portions of one or more of the host devices 102, the storage arrays 106 and the storage object placement management system 112 are implemented on the same processing platform. The storage object placement management system 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1, in some embodiments, comprises a persistent memory that is implemented using a flash memory or other type of non-volatile memory of the storage array 106-1. More particular examples include NAND-based flash memory or other types of non-volatile memory such as resistive RAM, phase change memory, and spin torque transfer magneto-resistive RAM (STT-MRAM). The persistent memory is further assumed to be separate from the storage tiers 108 of the storage array 106-1, although in other embodiments the persistent memory may be implemented as a designated portion or portions of one or more of the storage tiers 108. For example, in some embodiments the storage tiers 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the storage object placement management system 112, may in some embodiments be implemented as part of a cloud-based system.

The storage tiers 108 of the storage array 106-1 can be implemented using solid state drives (SSDs). Such SSDs are implemented using non-volatile memory (NVM) devices such as flash memory. Other types of NVM devices that can be used to implement at least a portion of the storage tiers 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage tiers 108.

The storage arrays 106 may additionally or alternatively be configured to implement multiple distinct storage tiers of a multi-tier storage system. In some embodiments, the storage array 106-1 may be associated with a first storage tier and the storage array 106-S may be associated with a second, different storage tier. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

Organizations might require multiple storage tiers for various reasons, depending on their needs, goals, and infrastructure. For example, different applications and workloads may have varying performance requirements, and by using multiple storage tiers an organization can tailor the storage solution to match the performance needs of different applications. In addition, redundancy is important for ensuring data availability. Organizations often use multiple storage arrays to create high-availability clusters. If one storage array or data center fails, another can take over seamlessly to prevent downtime. As the data needs of an organization grow, additional storage capacity may be required. Multiple storage arrays can be added to scale storage capacity horizontally, making it easier to expand as needed without disrupting existing systems. Some organizations may require data isolation for security or compliance reasons. Multiple storage arrays can physically or logically separate different data types or workloads. Organizations might replicate data across geographically dispersed storage arrays to ensure business continuity. Organizations often maintain separate storage arrays for backups and long-term data archiving. This helps keep backup data isolated and ensures that archived data remains accessible for compliance or historical purposes. Some industries and organizations have specific regulatory requirements that dictate how data should be stored and managed. Multiple storage arrays can segregate and manage data in compliance with these regulations (for example, to protect health information or personally identifiable information).

As noted above, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays 106 arranged in an active-active configuration and/or an active-inactive configuration. For example, such an active-active configuration can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the storage object placement management system 112 may be implemented at least in part in the first geographic location, the second geographic location, and one or more other geographic locations. Thus, it is possible in some implementations of the system 100 for different ones of the host devices 102, the storage arrays 106 and the storage object placement management system 112 to reside in different data centers.

Numerous other distributed implementations of the host devices 102, the storage arrays 106 and the storage object placement management system 112 are possible. Accordingly, the host devices 102, the storage arrays 106 and the storage object placement management system 112 can also be implemented in a distributed manner across multiple data centers.

Additional examples of processing platforms utilized to implement portions of the system 100 in illustrative embodiments will be described in more detail below in conjunction with FIGS. 11 and 12.

It should be understood that the particular sets of modules and other components implemented in the system 100 as illustrated in FIG. 1 are presented by way of example only. In other embodiments, only subsets of these components, or additional or alternative sets of components, may be used, and such components may exhibit additional or alternative functionality and configurations.

It is to be appreciated that these and other features of illustrative embodiments are presented by way of example only, and should not be construed as limiting in any way.

As indicated previously, illustrative embodiments overcome various drawbacks of conventional practice by configuring the system 100 to include functionality for mapping storage objects to storage tiers using digital twins, as will be described in more detail.

In some data centers or other IT infrastructure that includes virtualized infrastructure (e.g., VDI environments including multiple VMs), SAN and NAS arrays may be virtualized. For example, a virtual volume (vVol) integration and management framework may be used to virtualize SAN and NAS arrays, enabling a more efficient operational model that, in at least some embodiments, is optimized for virtualized environments and is centered on the application instead of the infrastructure.

Generally, virtual volumes (also referred to herein as vVols) are encapsulations of VM files, virtual disks, and their derivatives. On a storage system, virtual volumes can reside in virtual volume datastores, which are also referred to as storage containers. Virtual volume datastores are a type of datastore which allows virtual volumes to map directly to a storage system at a more granular level than VM filesystem (VMFS) and Network File System (NFS) datastores. While VMFS and NFS datastores are managed and provisioned at the LUN or filesystem level, virtual volumes allow VMs or virtual disks to be managed independently. An end-user, for example, can create a virtual volume datastore based on underlying storage pools and allocate a specific portion of one or more storage pools to be used for the virtual volume datastore and its virtual volumes. A hypervisor may use NAS and SCSI Protocol Endpoints (PEs) as access points for IO communication between VMs and their virtual volume datastores on a storage system.

Accordingly, virtual volumes can be stored natively inside a storage system that is connected to one or more hosts through an Ethernet or a SAN connection. In some embodiments, the virtual volumes are exported as objects by a compliant storage system and are managed entirely by hardware on the storage side. Typically, a globally unique identifier (GUID) identifies a virtual volume. Virtual volumes are not preprovisioned, in at least some embodiments, but created automatically when VM management operations are performed. These operations can include, for example, a VM creation, cloning, and snapshotting. One or more virtual volumes can be associated with a VM.

Figure 2:
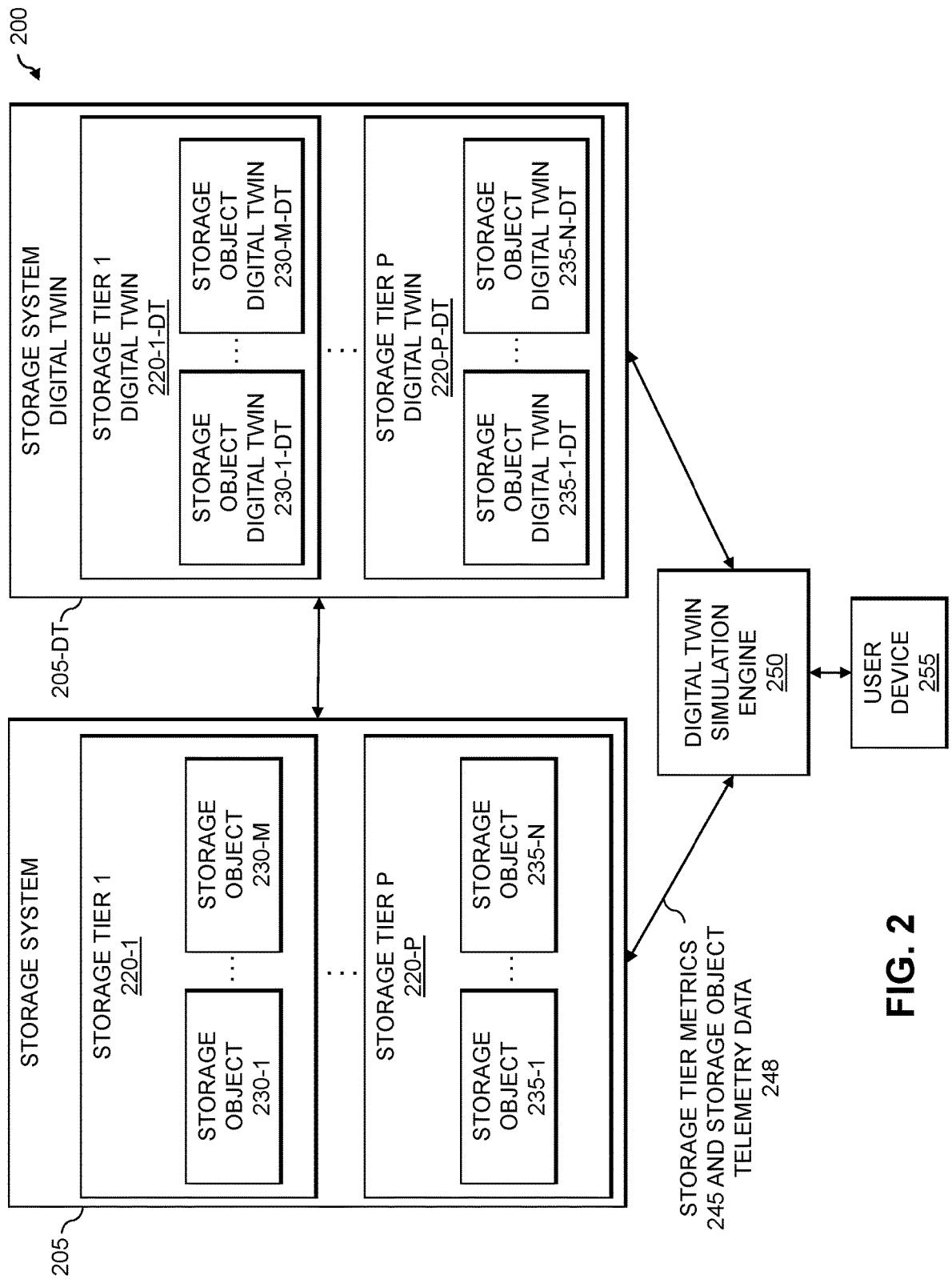
FIG. 2 illustrates a computing environment with digital twin simulation according to an illustrative embodiment.

FIG. 2 illustrates a computing environment 200 with digital twin simulation according to an illustrative embodiment. In the example of FIG. 2, a digital twin simulation engine 250 is operatively coupled to a storage system 205, itself comprising a plurality of storage tiers 220-1 through 220-P (collectively, storage tiers 220). As shown in FIG. 2, for a particular iteration of the digital twin simulation (e.g., for one storage object to storage tier placement option), storage tier 220-1, for example, stores data of a plurality of storage objects 230-1 through 230-M (collectively, storage objects 230) and exemplary storage tier 220-P stores data of a plurality of storage objects 235-1 through 235-N (collectively, storage objects 235).

The digital twin simulation engine 250 is further operatively coupled to a storage system digital twin 205-DT comprising a plurality of storage tier digital twins 220-1-DT through 220-P-DT (collectively, storage tier digital twins 220-DT). The storage system digital twin 205-DT is used to simulate different storage object placement scenarios (e.g., different storage object to storage tier placement options) to provide a cost-effective storage tiering configuration.

As shown in FIG. 2, the storage tier digital twin 220-1-DT, for example, simulates storage of data of a plurality of simulated storage object digital twins 230-1-DT through 230-M-DT (collectively, storage object digital twins 230-DT) and exemplary storage tier digital twin 220-P-DT simulates storage of data of a plurality of simulated storage object digital twins 235-1-DT through 235-N-DT (collectively, storage object digital twins 235-DT).

As further shown in FIG. 2, a user device 255 interacts with the digital twin simulation engine 250. User device 255 may be associated with an individual, a computing system, or some combination thereof. In one example, user device 255 comprises a system associated with an IT administrator, for example. It is to be further understood that the digital twin simulation engine 250 can be considered as an example of a controller.

In at least one implementation, the storage system 205 provides the digital twin simulation engine 250 with one or more designated storage tier metrics 245 for each storage tier 220 and telemetry data 248 for each storage object 230, 235, as discussed further below in conjunction with FIGS. 3 and 4, respectively. As the digital twin simulation engine 250 incorporates the storage tier metrics 245 and telemetry data 248, the digital twin simulation engine 250 reflects the storage system 205 and can be used to simulate multiple storage object to storage tier placement options (for example, in multiple iterations) in the storage system digital twin 205-DT.

In some embodiments, the storage system 205 may provide the digital twin simulation engine 250 with an aggregation of one or more of the designated storage tier metrics 245 for each storage tier 220 and/or one or more of the telemetry data 248 for each storage object 230, 235 in addition to, or instead of, the individual designated storage tier metrics 245 and/or telemetry data 248.

The digital twin simulation engine 250 uses the storage tier metrics 245 for each storage tier 220 to initialize the storage system digital twin 205-DT (or portions thereof). In this manner, the digital twin simulation engine 250 knows, for each storage tier 220, the corresponding storage tier metrics 245. In addition, the digital twin simulation engine 250 uses the telemetry data 248 for each storage object 230, 235 to configure the storage system digital twin 205-DT (or portions thereof) for each simulation iteration that corresponds to a different storage object to storage tier placement option.

In one or more embodiments, the disclosed storage object placement techniques employ the storage system digital twin 205-DT (or portions thereof) of one or more storage systems 205 to evaluate respective storage object placement scores, determined using the respective designated storage tier metrics 245 for each storage tier 220 and one or more of the telemetry data 248 for each storage object 230, 235, for various storage object to storage tier placement options. In at least some embodiments, a storage object placement score is determined for each storage object to storage tier placement option based on, for example, a total storage cost for each of the storage tiers 220 in the particular storage object to storage tier placement option.

It is to be appreciated that, in one or more embodiments, the digital twin simulation engine 250 is configured to generate one or more storage tier digital twins 220-DT or otherwise obtain one or more storage tier digital twins 220-DT. In one or more illustrative embodiments, one or more storage tier digital twins 220-DT can be configured using one or more physics-based models, one or more AI-driven models, one or more simulations, one or more analytics, and one or more predictions based on the particular storage tier 220 being virtually represented. Thus, real-time data (e.g., current values of the storage tier metrics 245 for the particular storage tier 220 being virtually represented and/or of the telemetry data 248 for each storage object 230, 235) and/or historical data (e.g., historical values of the storage tier metrics 245 for the particular storage tier 220 being virtually represented and/or historical values of the telemetry data 248 for each storage object 230, 235) can be data collected from a given storage tier 220 and/or some other data source.

In one or more illustrative embodiments, by way of example only, assume that a given storage tier digital twin 220-DT is needed/desired for on-demand simulations. That is, when user device 255 wishes to simulate storage object placement changes to a given storage tier 220, user device 255 can request digital twin simulation engine 250 to create/construct (e.g., spin up or instantiate) a digital twin of the given storage tier 220 using one or more corresponding images (e.g., snapshots or the like) from a device image datastore (not expressly shown) augmented with real-time data associated with the given storage tier 220.

Figure 3:
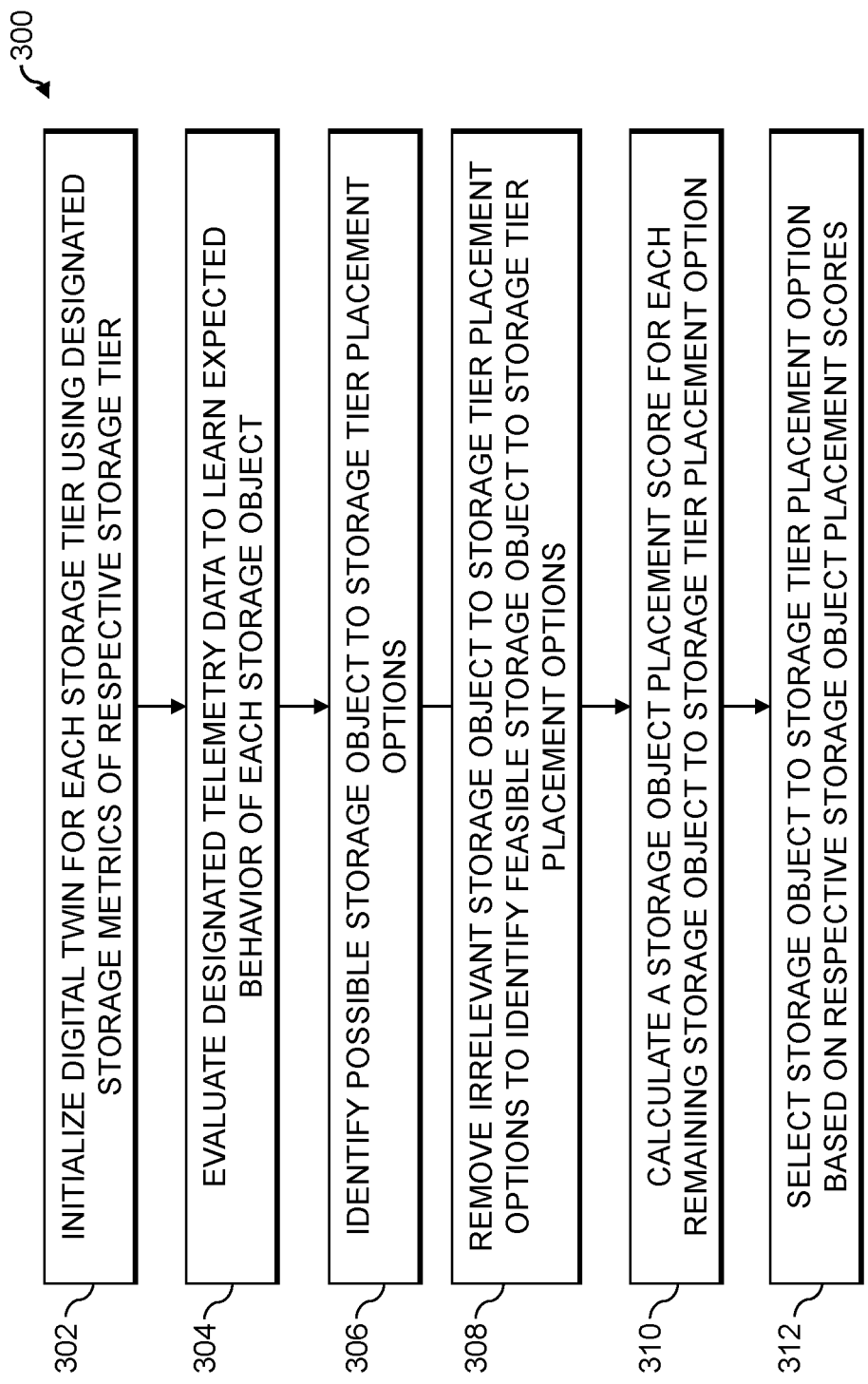
FIG. 3 is a flow diagram illustrating an exemplary implementation of a process for mapping storage objects to storage tiers using digital twins in an illustrative embodiment.

FIG. 3 is a flow diagram illustrating an exemplary implementation of a process 300 for mapping storage objects to storage tiers using digital twins in an illustrative embodiment. In the example of FIG. 3, the process 300 initializes a digital twin for each of a plurality of storage tiers in step 302 using one or more designated storage metrics of the respective storage tiers, as discussed further below in conjunction with FIG. 4, for example.

In step 304, designated telemetry data associated with the storage objects is evaluated to learn an expected behavior of each storage object, as discussed further below in conjunction with FIG. 5, for example. Possible storage object to storage tier placement options are identified in step 306, as discussed further below in conjunction with FIG. 5, for example.

Irrelevant storage object to storage tier placement options, such as placement options that are not feasible due to performance and/or storage capacity limitations, are removed in step 308 to identify feasible storage object to storage tier placement options, as discussed further below in conjunction with FIG. 7, for example. The process 300 calculates a storage object placement score for each remaining (e.g., relevant) storage object to storage tier placement option in step 310, as discussed further below in conjunction with FIG. 8, for example. Finally, a storage object to storage tier placement option is selected in step 312 based at least in part on the respective storage object placement scores, as discussed further below in conjunction with FIG. 9, for example.

FIG. 4 is a sample table illustrating designated storage metrics 400 for simulating one or more storage tiers in an illustrative embodiment. As noted above, the designated storage metrics of FIG. 4 are used to initialize a digital twin that simulates the respective storage tier, as would be apparent to a person of ordinary skill in the art. In the example of FIG. 4, the designated storage metrics 400 for simulating a given storage tier comprise one or more capacity limitations indicating an amount of storage space available in the given storage tier; one or more data transfer limitations indicating a data throughput available in the given storage tier; and a cost calculation algorithm that provides a method for calculating the costs associated with the given storage tier.

FIG. 5 is a sample table illustrating designated telemetry metrics 500 for characterizing an expected behavior of one or more storage objects in an illustrative embodiment. In some embodiments, the disclosed storage object to storage tier placement techniques evaluate a footprint of a given storage object using the existing telemetry data as an indicator of expected behavior of the storage object. In the example of FIG. 5, a total number of read operations can be evaluated during a specified period (e.g., look at billing period) to determine an amount of data read from the given storage object to external host devices.

In addition, a total number of write operations can be evaluated during the specified period to determine an amount of data written to the given storage object from external host devices. A maximum throughput during the specified period can be evaluated during the specified period to determine the throughput required to support the load on the given storage object.

A storage object capacity of the given storage object and a minimal data reduction ratio of the given storage object during a specified period may be evaluated to determine the storage capacity required to store the respective storage object following the data reduction.

FIG. 6 is a sample table illustrating representative storage object to storage tier placement options 600 in an illustrative embodiment. In the example of FIG. 6, three storage objects (e.g., objects A, B and C) and two storage tiers (e.g., tier 1 and tier 2) are considered to illustrate the disclosed techniques for mapping storage objects to storage tiers using digital twins. The disclosed techniques may also be applied for a larger number of storage objects and/or a larger number of storage tiers, as would be apparent to a person of ordinary skill in the art based on the present disclosure.

In the example of FIG. 6, storage object to storage tier placement option 1 assigns storage object A to storage tier 1, storage object B to storage tier 1 and storage object C to storage tier 1, while storage object to storage tier placement option 5, for example, assigns storage object A to storage tier 2, storage object B to storage tier 1 and storage object C to storage tier 1. In general, the storage object to storage tier placement options 600 of FIG. 6 comprise a listing of all possible storage object placement options.

FIG. 7 comprises sample tables illustrating feasible storage object to storage tier placement options in an illustrative embodiment. In the example of FIG. 7, a first table illustrates whether a number of storage object to storage tier placement options 700 are feasible with respect to performance limitations and a second table illustrates whether a number of storage object to storage tier placement options 750 are feasible with respect to capacity limitations. It is noted that a storage object to storage tier placement of A-1, B-1, C-1, for example, indicates that storage object A is assigned to storage tier 1, storage object B is assigned to storage tier 1 and storage object C is assigned to storage tier 1.

The tables of FIG. 7 may be used in some embodiments to rule out irrelevant options using one or more limitations set in the "digital twin" instances (options may be eliminated based on a comparison of storage object requirements and tier capabilities, such as performance limitations, as shown in the first table of FIG. 7, capacity limitations, as shown in the second table of FIG. 7, cost limitations (not shown in FIG. 7) or other feasibility criteria). Thus, once non-feasible storage object to storage tier placement options are removed, only the relevant options may be considered for the cost calculation discussed further below in conjunction with FIG. 8.

In the first table of FIG. 7, assume that (i) tier 1 can serve up to 1000 IOPS (input/output operations per second) and tier 2 can serve up to 5000 IOPS, and (ii) storage object A requires 500 IOPS, storage object B requires 2000 IOPS, and storage object C requires 500 IOPS. Thus, the A-1, B-1, C-1 storage object to storage tier placement option, for example, is not feasible since 3000 IOPS need to be processed by tier 1, but tier 1 has a performance limitation of 1000 IOPS. Likewise, the A-1, B-1, C-2 storage object to storage tier placement option is not feasible since 2500 IOPS need to be processed by tier 1, but tier 1 has a performance limitation of 1000 IOPS. The A-1, B-2, C-1 storage object to storage tier placement option is feasible since 1000 IOPS need to be processed by tier 1, within the performance limitation of 1000 IOPS and 2000 IOPS need to be processed by tier 2, within the performance limitation of 5000 IOPS. It is noted that any storage object to storage tier placement option in FIG. 7 having an indication of "NO" in the final column is not a feasible placement option.

In the second table of FIG. 7, assume that (i) tier 1 has a storage capacity of 100 GB and tier 2 has a storage capacity of 200 GB, and (ii) storage object A requires 60 GB, storage object B requires 50 GB and storage object C requires 30 GB. Thus, the A-1, B-1, C-1 storage object to storage tier placement option, for example, is not feasible since 140 GBs are needed by tier 1 to store the storage objects A, B and C, but tier 1 has a capacity limitation of 100 GB. Likewise, the A-1, B-1, C-2 storage object to storage tier placement option is not feasible since 110 GB are needed by tier 1 to store the storage objects A and B, but tier 1 has a capacity limitation of 100 GB. The A-1, B-2, C-1 storage object to storage tier placement option is feasible since 90 GBs are needed by tier 1 to store the storage objects A and C, and tier 1 has a capacity limitation of 100 GB, and 50 GBs are needed by tier 2 to store the storage object B, and tier 2 has a capacity limitation of 200 GB.

Additional techniques may be employed to further reduce the number of placement options considered for the cost calculation discussed further below in conjunction with FIG. 8. For example, consider a storage system having three storage tiers (e.g., tier 1 may be fast and expensive tier 3 may be slower and cheaper and tier 2 may have characteristics between those of tier 1 and tier 3). In addition, assume that a storage object can fit into tier 2 according to the designated performance and capacity requirements, for example. Thus, the number of placement options to be considered can be further reduced by dropping any option with the storage object assigned to tier 1, for example.

FIG. 8 comprises sample tables illustrating a calculation of a storage object placement score for multiple storage tiers of a representative storage object to storage tier placement option in an illustrative embodiment. In the example of FIG. 8, a first table illustrates a storage object placement score 800 for storage tier 1 for placement option 4 of FIG. 6 (where only storage object A is assigned to tier 1) and a second table illustrates a storage object placement score 850 for storage tier 2 for placement option 4 (where storage objects B and C are assigned to tier 2).

The techniques described in conjunction with FIG. 8 may be used to calculate a storage object placement cost for each remaining placement option (e.g., those placement options that were marked as feasible in one or more of the tables of FIG. 7). In the example of FIG. 8, it is assumed that tier 1 is used for infrequently accessed data and tier 2 is used for more frequently accessed data. The cost calculation algorithm storage metric of FIG. 4 defines the method for calculating the costs associated with the respective storage tier.

The storage object placement score 800 for tier 1 is determined by a number of feature values specified for the storage objects stored by tier 1 using the current placement option (e.g., only storage object A is assigned to tier 1 for placement option 4). In the example of FIG. 8, the considered feature values for the storage objects stored by a given storage tier comprise a "capacity" feature, an "in" traffic feature, an "out" traffic feature, and a "replication" feature. In addition, a price is specified (e.g., by a cloud-based storage provider) for each considered feature value (e.g., the cost attributed to the "capacity" feature for tier 1 is $0.0125 per GB, for example).

Object A, in the first table, has a "capacity" value of 1024 GB, an "in" traffic value of 500 GB, an "out" traffic value of 20 GB, and a "replication" value of 0 GB per day. The feature values for object A are multiplied by the corresponding pricing designated by the storage provider, as shown in the first table in FIG. 8 and each of the costs associated with the respective feature values are summed to determine a total cost of providing the respective storage tier associated with the placement option ($14.50, in the example of FIG. 8).

Object B, in the second table, has a "capacity" value of 100 GB, an "in" traffic value of 20 GB, an "out" traffic value of 400 GB, and a "replication" value of 5 GB per day. Likewise, object C, in the second table, has a "capacity" value of 200 GB, an "in" traffic value of 500 GB, an "out" traffic value of 10 GB, and a "replication" value of 50 GB per day. The feature values for objects B and C are summed and the total for each feature value is multiplied by the corresponding pricing designated by the storage provider, as shown in the second table in FIG. 8. Each of the costs associated with the respective feature values are summed to determine a total cost of providing the respective storage tier associated with the placement option.

A total cost of the placement option is determined by summing the total cost of providing each storage tier associated with the respective placement option (e.g., the total cost of placement option 4 is 56.78 USD (e.g., the sum of 14.50 USD and 42.28 USD)).

The calculation costs may be further reduced by calculating the cost of placement option 1, for example, and marking the calculated price of placement option 1 as the "minimum price." The cost of the next placement option may be determined until the price of the next placement option exceeds the current "minimum price." If the next placement option exceeds the current "minimum price," the simulation of the next placement option may be stopped and a different placement option may be considered. If the next placement option does not exceed the current "minimum price," the cost of the next placement option may be used as the new "minimum price," and a different placement option may be considered until all options are considered. In this manner, the number of computation cycles is reduced and a final response is determined more quickly.

Generally, in some embodiments, after the feasible placement options are simulated using the techniques described above, a cost-effective placement option is selected.

Figure 9:
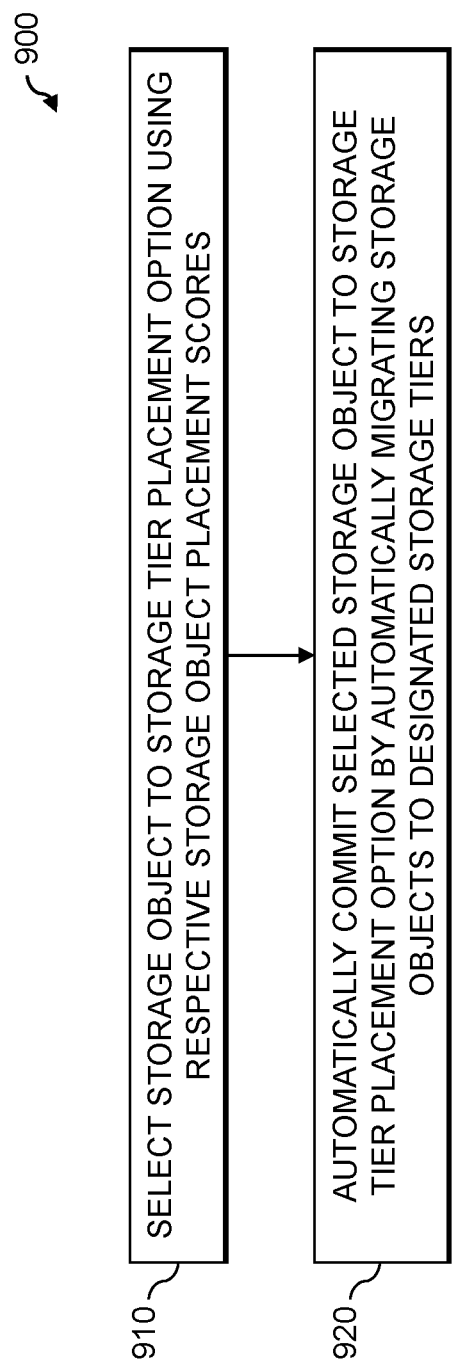
FIG. 9 is a flow diagram illustrating an exemplary implementation of a process for initiating an implementation of a selected storage object to storage tier placement option in an illustrative embodiment.

FIG. 9 is a flow diagram illustrating an exemplary implementation of a process 900 for initiating an implementation of a selected storage object to storage tier placement option in an illustrative embodiment. In various embodiments, the selected placement option may be suggested to the user as a recommendation, and/or automatically committed (e.g., by requesting the storage management software to migrate storage objects to the designated storage tier associated with the selected placement option).

In the example of FIG. 9, a storage object to storage tier placement option is selected in step 910 using the respective storage object placement scores (e.g., determined using the cost-based techniques of FIG. 8). The process 900 automatically commits the selected storage object to storage tier placement option in step 920 by automatically migrating one or more storage objects to the designated storage tiers associated with the selected storage object placement option.

Figure 10:
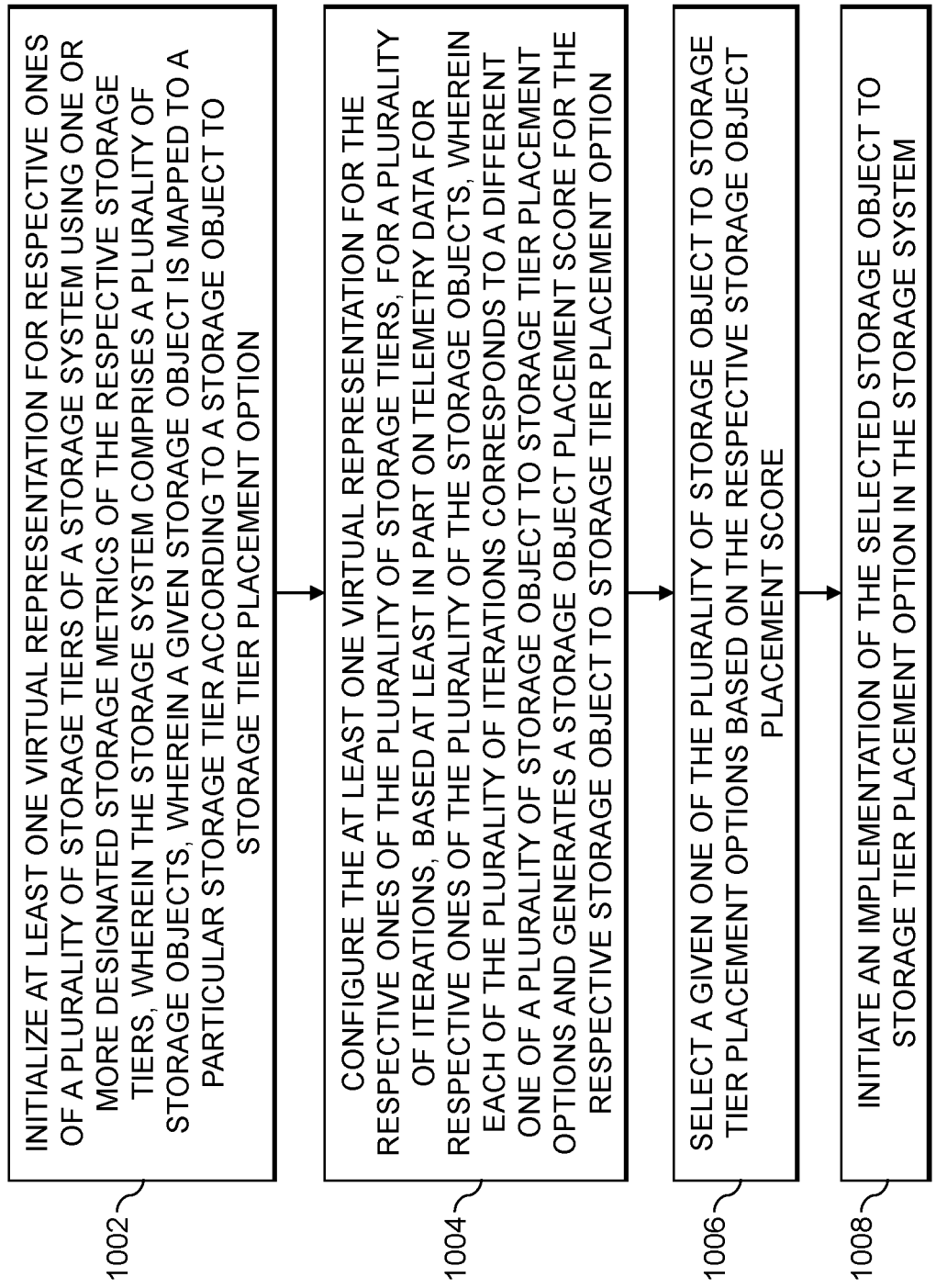
FIG. 10 is a flow diagram illustrating an exemplary implementation of a process for mapping storage objects to storage tiers using digital twins in an illustrative embodiment.

FIG. 10 is a flow diagram illustrating an exemplary implementation of a process 1000 for mapping storage objects to storage tiers using digital twins in an illustrative embodiment. In the example of FIG. 10, at least one virtual representation is initialized in step 1002 for respective ones of a plurality of storage tiers of a storage system using one or more designated storage metrics of the respective storage tiers, wherein the storage system comprises a plurality of storage objects, wherein a given storage object is mapped to a particular storage tier according to a storage object to storage tier placement option. The at least one virtual representation is configured in step 1004 for the respective ones of the plurality of storage tiers, for a plurality of iterations, based at least in part on telemetry data for respective ones of the plurality of the storage objects, wherein each of the plurality of iterations corresponds to a different one of a plurality of storage object to storage tier placement options and generates a storage object placement score for the respective storage object to storage tier placement option.

In step 1006, a given one of the plurality of storage object to storage tier placement options is selected based at least in part on the respective storage object placement score. An implementation of the selected storage object to storage tier placement option is initiated in the storage system in step 1008.

In some embodiments, the telemetry data for a given storage object may comprise a number of read operations during a designated time period, a number of write operations during a designated time period, a data throughput during a designated time period and/or a storage capacity needed to store the given storage object during a designated time period. The storage object placement score for a particular storage object to storage tier placement option may be based on a total storage cost for each of the storage tiers in the particular storage object to storage tier placement option. The storage object placement score for a particular storage object to storage tier placement option may be determined, for example, in response to the particular storage object to storage tier placement option satisfying one or more feasibility criteria.

In one or more embodiments, the at least one virtual representation comprises a virtual representation of at least one storage object of the storage system. The at least one virtual representation may comprise at least one digital twin.

In at least one embodiment, the initiating the implementation of the selected storage object to storage tier placement option may comprise generating at least one recommendation and/or generating at least one notification to implement the selected storage object to storage tier placement option. The initiating the implementation of the selected storage object to storage tier placement option may comprise automatically migrating one or more storage objects to a designated storage tier associated with the selected storage object to storage tier placement option.

The particular processing operations and other network functionality described in conjunction with FIGS. 3, 9 and 10, for example, are presented by way of illustrative example only, and should not be construed as limiting the scope of the disclosure in any way. Alternative embodiments can use other types of processing operations to provide functionality for mapping storage objects to storage tiers using digital twins. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed storage object placement techniques improve storage tiering decision making to improve cost savings. Effective placement options are identified by removing non-feasible or inefficient placement options and digital twin techniques are employed to simulate a cost assessment for each placement option. Among other benefits, improved techniques are provided for improving storage tiering and for reducing storage costs by providing an automated algorithm that evaluates each storage tiering option.

Illustrative embodiments of processing platforms utilized to implement functionality for mapping storage objects to storage tiers using digital twins will now be described in greater detail with reference to FIGS. 11 and 12. Although described in the context of information processing system 100, these platforms may also be used to implement at least portions of other information processing systems in other embodiments.

Figure 11:
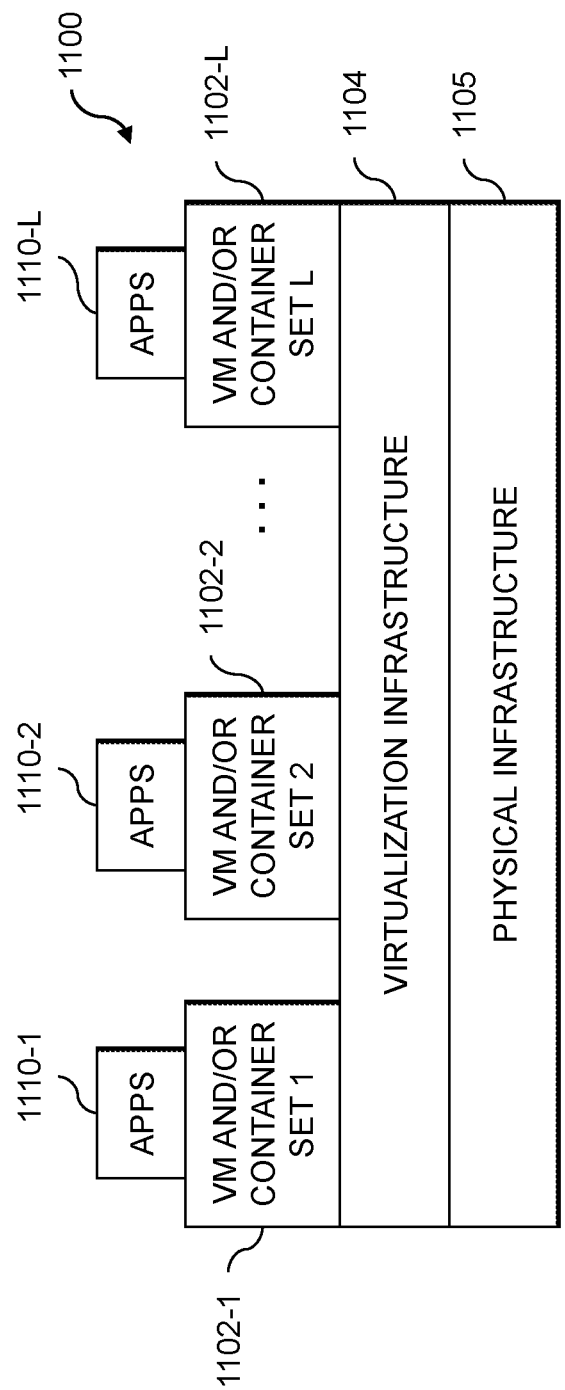
FIGS. 11 and 12 show examples of processing platforms that may be utilized to implement at least a portion of an information processing system in illustrative embodiments.
Figure 12:
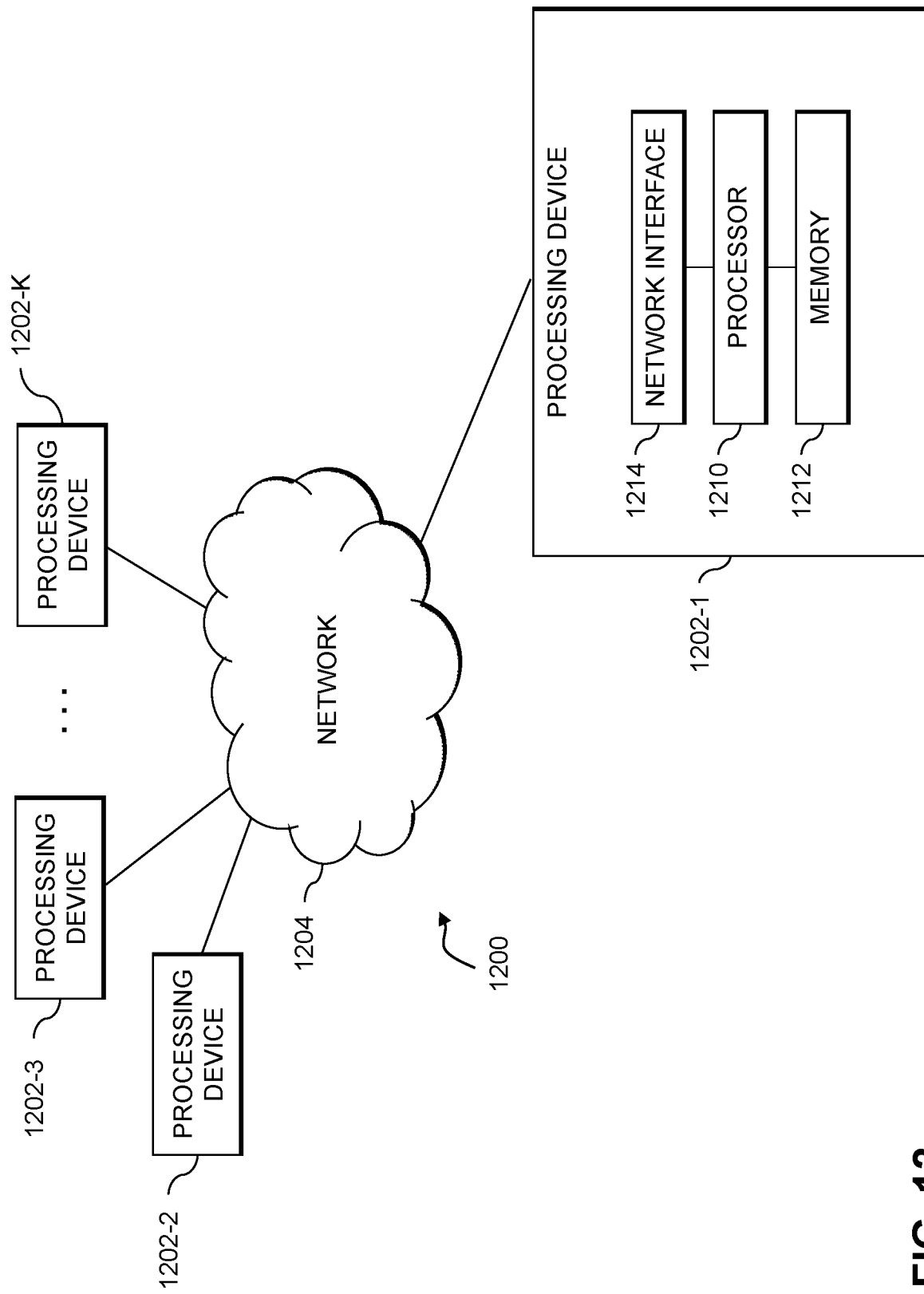

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple VMs and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of information processing system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the processing platform 1200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for mapping storage objects to storage tiers using digital twins as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   initializing at least one virtual representation for respective ones of a plurality of storage tiers of a storage system using one or more designated storage metrics of the respective storage tiers, wherein the storage system comprises a plurality of storage objects, and wherein a storage object to storage tier placement option comprises a mapping of a given storage object to a particular storage tier, wherein the plurality of storage tiers comprises at least a first storage tier comprised of one or more storage devices of at least a first performance level and a second storage tier comprised of one or more storage devices of at least a different performance level, and wherein the at least one virtual representation of a given one of the plurality of storage tiers is distinct from the given storage tier;

configuring the at least one virtual representation for the respective ones of the plurality of storage tiers, for a plurality of iterations, based at least in part on telemetry data for respective ones of the plurality of the storage objects, wherein each of the plurality of iterations corresponds to a different one of a plurality of storage object to storage tier placement options and generates a storage object placement score for the respective storage object to storage tier placement option;

selecting a given one of the plurality of storage object to storage tier placement options based at least in part on the respective storage object placement score; and initiating an implementation of the selected storage object to storage tier placement option in the storage system;

wherein the method is performed by at least one processing device comprising a processor coupled to a memory.

2. The method of claim 1, wherein the telemetry data for a given storage object comprises one or more of a number of read operations during a designated time period, a number of write operations during a designated time period, a data throughput during a designated time period and a storage capacity needed to store the given storage object during a designated time period.

3. The method of claim 1, wherein the storage object placement score for a particular storage object to storage tier placement option is based at least in part on a total storage cost for each of the storage tiers in the particular storage object to storage tier placement option.

4. The method of claim 3, wherein the storage object placement score for a particular storage object to storage tier placement option is determined in response to the particular storage object to storage tier placement option satisfying one or more feasibility criteria.

5. The method of claim 1, wherein the at least one virtual representation comprises a virtual representation of at least one storage object of the storage system.

6. The method of claim 1, wherein the at least one virtual representation comprises at least one digital twin.

7. The method of claim 1, wherein the initiating the implementation of the selected storage object to storage tier placement option comprises one or more of generating at least one recommendation and generating at least one notification to implement the selected storage object to storage tier placement option.

8. The method of claim 1, wherein the initiating the implementation of the selected storage object to storage tier placement option comprises automatically migrating one or more storage objects to a designated storage tier associated with the selected storage object to storage tier placement option.

9. An apparatus comprising:
at least one processing device comprising a processor coupled to a memory;
the at least one processing device being configured to implement the following steps:

initializing at least one virtual representation for respective ones of a plurality of storage tiers of a storage system using one or more designated storage metrics of the respective storage tiers, wherein the storage system comprises a plurality of storage objects, and wherein a storage object to storage tier placement option comprises a mapping of a given storage object to a particular storage tier, wherein the plurality of storage tiers comprises at least a first storage tier comprised of one or more storage devices of at least a first performance level and a second storage tier comprised of one or more storage devices of at least a different performance level, and wherein the at least one virtual representation of a given one of the plurality of storage tiers is distinct from the given storage tier;

configuring the at least one virtual representation for the respective ones of the plurality of storage tiers, for a plurality of iterations, based at least in part on telemetry data for respective ones of the plurality of the storage objects, wherein each of the plurality of iterations corresponds to a different one of a plurality of storage object to storage tier placement options and generates a storage object placement score for the respective storage object to storage tier placement option;

selecting a given one of the plurality of storage object to storage tier placement options based at least in part on the respective storage object placement score; and initiating an implementation of the selected storage object to storage tier placement option in the storage system.

10. The apparatus of claim 9, wherein the telemetry data for a given storage object comprises one or more of a number of read operations during a designated time period, a number of write operations during a designated time period, a data throughput during a designated time period and a storage capacity needed to store the given storage object during a designated time period.

11. The apparatus of claim 9, wherein the storage object placement score for a particular storage object to storage tier placement option is based at least in part on a total storage cost for each of the storage tiers in the particular storage object to storage tier placement option.

12. The apparatus of claim 11, wherein the storage object placement score for a particular storage object to storage tier placement option is determined in response to the particular storage object to storage tier placement option satisfying one or more feasibility criteria.

13. The apparatus of claim 9, wherein the initiating the implementation of the selected storage object to storage tier placement option comprises one or more of generating at least one recommendation and generating at least one notification to implement the selected storage object to storage tier placement option.

14. The apparatus of claim 9, wherein the initiating the implementation of the selected storage object to storage tier placement option comprises automatically migrating one or more storage objects to a designated storage tier associated with the selected storage object to storage tier placement option.

15. A non-transitory processor-readable storage medium having stored therein program code of one or more software programs, wherein the program code when executed by at least one processing device causes the at least one processing device to perform the following steps:

initializing at least one virtual representation for respective ones of a plurality of storage tiers of a storage system using one or more designated storage metrics of the respective storage tiers, wherein the storage system comprises a plurality of storage objects, and wherein a storage object to storage tier placement option comprises a mapping of a given storage object to a particular storage tier, wherein the plurality of storage tiers comprises at least a first storage tier comprised of one or more storage devices of at least a first performance level and a second storage tier comprised of one or more storage devices of at least a different performance level, and wherein the at least one virtual representation of a given one of the plurality of storage tiers is distinct from the given storage tier;

configuring the at least one virtual representation for the respective ones of the plurality of storage tiers, for a plurality of iterations, based at least in part on telemetry data for respective ones of the plurality of the storage objects, wherein each of the plurality of iterations corresponds to a different one of a plurality of storage object to storage tier placement options and generates a storage object placement score for the respective storage object to storage tier placement option;

selecting a given one of the plurality of storage object to storage tier placement options based at least in part on the respective storage object placement score; and initiating an implementation of the selected storage object to storage tier placement option in the storage system.

16. The non-transitory processor-readable storage medium of claim 15, wherein the telemetry data for a given storage object comprises one or more of a number of read operations during a designated time period, a number of write operations during a designated time period, a data throughput during a designated time period and a storage capacity needed to store the given storage object during a designated time period.

17. The non-transitory processor-readable storage medium of claim 15, wherein the storage object placement score for a particular storage object to storage tier placement option is based at least in part on a total storage cost for each of the storage tiers in the particular storage object to storage tier placement option.

18. The non-transitory processor-readable storage medium of claim 17, wherein the storage object placement score for a particular storage object to storage tier placement option is determined in response to the particular storage object to storage tier placement option satisfying one or more feasibility criteria.

19. The non-transitory processor-readable storage medium of claim 15, wherein the initiating the implementation of the selected storage object to storage tier placement option comprises one or more of generating at least one recommendation and generating at least one notification to implement the selected storage object to storage tier placement option.

20. The non-transitory processor-readable storage medium of claim 15, wherein the initiating the implementation of the selected storage object to storage tier placement option comprises automatically migrating one or more storage objects to a designated storage tier associated with the selected storage object to storage tier placement option.

* * * * *